United States Patent
Takizawa

(10) Patent No.: US 11,329,271 B2
(45) Date of Patent: May 10, 2022

(54) SLURRY COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventor: Kayoko Takizawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 454 days.

(21) Appl. No.: 16/328,860

(22) PCT Filed: Sep. 1, 2017

(86) PCT No.: PCT/JP2017/031662
§ 371 (c)(1),
(2) Date: Feb. 27, 2019

(87) PCT Pub. No.: WO2018/061622
PCT Pub. Date: Apr. 5, 2018

(65) Prior Publication Data
US 2019/0190008 A1    Jun. 20, 2019

(30) Foreign Application Priority Data
Sep. 27, 2016  (JP) .............................. JP2016-188590

(51) Int. Cl.
*H01M 4/136*   (2010.01)
*H01M 4/1397*  (2010.01)
*H01M 4/62*    (2006.01)
*H01M 10/0525* (2010.01)
*H01M 4/58*    (2010.01)
*H01M 4/02*    (2006.01)
*H01M 10/052*  (2010.01)

(52) U.S. Cl.
CPC ......... *H01M 4/136* (2013.01); *H01M 4/1397* (2013.01); *H01M 4/5825* (2013.01); *H01M 4/622* (2013.01); *H01M 4/625* (2013.01); *H01M 10/0525* (2013.01); *H01M 10/052* (2013.01); *H01M 2004/021* (2013.01); *H01M 2004/028* (2013.01)

(58) Field of Classification Search
CPC .. H01M 4/136; H01M 4/1397; H01M 4/5825; H01M 4/622; H01M 4/625; H01M 10/0525; H01M 10/052
See application file for complete search history.

(56) References Cited

U.S. PATENT DOCUMENTS

| | | | |
|---|---|---|---|
| 2002/0122985 A1* | 9/2002 | Sato ....................... | H01G 9/155 429/232 |
| 2006/0257738 A1 | 11/2006 | Kim et al. | |
| 2008/0102196 A1 | 5/2008 | Morishima et al. | |
| 2008/0318049 A1 | 12/2008 | Hata et al. | |
| 2014/0349185 A1* | 11/2014 | Momose ............. | H01M 4/0404 429/217 |
| 2015/0099167 A1 | 4/2015 | Oshima et al. | |
| 2016/0118663 A1 | 4/2016 | Maruhashi | |
| 2017/0309948 A1* | 10/2017 | Azami .................... | H01M 4/62 |

FOREIGN PATENT DOCUMENTS

| | | |
|---|---|---|
| JP | 2006516795 A | 7/2006 |
| JP | 2008117541 A | 5/2008 |
| JP | 2012115096 A | 6/2012 |
| JP | 2012204303 A | 10/2012 |
| JP | 2014096343 A | 5/2014 |
| JP | 2014232567 A | 12/2014 |
| JP | 2015225761 A | 12/2015 |
| JP | 2016021390 A | 2/2016 |
| JP | 2016149313 A | 8/2016 |
| WO | 2006011655 A1 | 2/2006 |
| WO | 2014192238 A1 | 12/2014 |
| WO | 2016052048 A1 | 4/2016 |

OTHER PUBLICATIONS

Apr. 2, 2019, International Preliminary Report on Patentability issued in the International Patent Application No. PCT/JP2017/031662.
Oct. 31, 2017, International Search Report issued in the International Patent Application No. PCT/JP2017/031662.
Jan. 29, 2020, the Extended European Search Report issued by the European Patent Office in the corresponding European Patent Application No. 17855580.1.

* cited by examiner

Primary Examiner — Helen Oi K Conley
(74) Attorney, Agent, or Firm — Kenja IP Law PC

(57) ABSTRACT

Provided is a slurry composition for a positive electrode that has excellent dispersibility and enables production of a secondary battery that can display good output characteristics. The slurry composition for a non-aqueous secondary battery positive electrode contains a positive electrode active material, a conductive material, a particulate polymer, and a polyhydric alcohol polycondensate. The positive electrode active material includes an iron-containing compound. The particulate polymer includes a hydroxyl group-containing monomer unit.

11 Claims, No Drawings

SLURRY COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY

TECHNICAL FIELD

The present disclosure relates to a slurry composition for a non-aqueous secondary battery positive electrode, a positive electrode for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy-density and power-density, and the ability to be repeatedly charged and discharged, and are used in a wide range of applications. Consequently, in recent years, studies have been made to improve electrodes and other battery components with the aim of achieving even higher non-aqueous secondary battery performance.

A positive electrode for a secondary battery such as a lithium ion secondary battery generally includes a current collector and a positive electrode mixed material layer formed on the current collector. The positive electrode mixed material layer is formed by applying, onto the current collector, a composition in the form of a slurry that contains a positive electrode active material, a conductive material, a polymer serving as a binder, and so forth dispersed in a dispersion medium, and then drying the composition, for example.

In recent years, attempts have been made to improve slurry compositions for positive electrodes used in the formation of positive electrode mixed material layers with the aim of further improving secondary battery performance.

One example is a known technique of using a compound containing the transition metal iron (iron-containing compound) as a positive electrode active material in order to further improve secondary battery performance (for example, refer to PTL 1 and 2).

Specifically, PTL 1, for example, discloses an aqueous slurry composition for a positive electrode that contains olivine-type lithium iron phosphate (LiFePO$_4$) as a positive electrode active material, acetylene black as a conductive material, and polymer particles having a specific chemical composition as a binder. A power storage device produced using the slurry composition for a positive electrode of PTL 1 has enhanced battery performance in terms of charge/discharge rate characteristics, capacity maintenance rate, and the like.

PTL 2 discloses a slurry composition for a lithium ion secondary battery positive electrode containing olivine-type lithium iron phosphate (LiFePO$_4$) as a positive electrode active material, acetylene black as a conductive material, a particulate binder having a specific chemical composition, and a water-soluble polymer including an acidic group. A lithium ion secondary battery produced using the slurry composition for a positive electrode of PTL 2 has good output characteristics.

CITATION LIST

Patent Literature

PTL 1: WO 2016/052048 A1
PTL 2: WO 2014/192238 A1

SUMMARY

Technical Problem

In order to further improve battery characteristics of a secondary battery, it is generally necessary to favorably disperse an electrode active material in a slurry composition and to form an electrode mixed material layer having a uniform structure. However, iron-containing compounds such as LiFePO$_4$ tend to aggregate, and there is room for improvement of the slurry compositions described in PTL 1 and 2 in terms of increasing dispersibility.

In particular, there are cases in which an iron-containing compound having a small particle diameter is used as a positive electrode active material with the aim of further improving output characteristics of a secondary battery, but a fine iron-containing compound has an even higher tendency to aggregate. Consequently, there is demand, in particular, for sufficiently improving slurry composition dispersibility in a case in which a fine iron-containing compound is used.

Accordingly, an objective of the present disclosure is to provide a slurry composition for a positive electrode that has excellent dispersibility and enables production of a secondary battery that can display good output characteristics.

Another objective of the present disclosure is to provide a positive electrode that enables production of a secondary battery that can display good output characteristics and also to provide a secondary battery that can display good output characteristics.

Solution to Problem

The inventor conducted diligent investigation with the aim of solving the problem set forth above. Through this investigation, the inventor discovered that a slurry composition for a positive electrode having excellent dispersibility can be obtained using a positive electrode active material that includes an iron-containing compound, a conductive material, a specific particulate polymer, and a polyhydric alcohol polycondensate. The inventor also discovered that a secondary battery that can display good output characteristics can be obtained using a positive electrode that is obtained using this slurry composition for a positive electrode. In this manner, the inventor completed the present disclosure.

Specifically, the present disclosure aims to advantageously solve the problem set forth above by disclosing a slurry composition for a non-aqueous secondary battery positive electrode comprising a positive electrode active material, a conductive material, a particulate polymer, and a polyhydric alcohol polycondensate, wherein the positive electrode active material includes an iron-containing compound, and the particulate polymer includes a hydroxyl group-containing monomer unit. The slurry composition for a positive electrode having the specific chemical composition set forth above has excellent dispersibility. Moreover, a secondary battery including a positive electrode obtained using this slurry composition for a positive electrode can display good output characteristics.

In the presently disclosed slurry composition for a non-aqueous secondary battery positive electrode, the conductive material preferably includes a fibrous conductive carbon material. This is because the inclusion of a fibrous conductive carbon material as a conductive material in the slurry composition for a positive electrode enables favorable reduction of internal resistance of a secondary battery including a positive electrode obtained using the slurry composition for a positive electrode and can, therefore, further improve secondary battery output characteristics.

Although fibrous conductive carbon materials generally have a high tendency to aggregate and poor dispersibility, the presently disclosed slurry composition for a positive electrode has good dispersibility even when a positive electrode active material including an iron-containing compound and a fibrous conductive carbon material are used together because the presently disclosed slurry composition for a positive electrode has the specific chemical composition set forth above.

In the presently disclosed slurry composition for a non-aqueous secondary battery positive electrode, the fibrous conductive carbon material preferably has a percentage content of at least 5 mass % and not more than 100 mass % among the conductive material. This is because inclusion of the fibrous conductive carbon material in the slurry composition for a positive electrode in the specific proportion set forth above enables good dispersibility and can also further improve output characteristics of a secondary battery including a positive electrode obtained using the slurry composition for a positive electrode.

In the presently disclosed slurry composition for a non-aqueous secondary battery positive electrode, content of the polyhydric alcohol polycondensate is preferably, by mass, at least 0.05 times and not more than 10 times content of the fibrous conductive carbon material. Through inclusion of the polyhydric alcohol polycondensate in the slurry composition for a positive electrode in an amount within the range set forth above, dispersibility of the slurry composition for a positive electrode can be further increased, and output characteristics of a secondary battery including a positive electrode obtained using the slurry composition for a positive electrode can be further improved.

In the presently disclosed slurry composition for a non-aqueous secondary battery positive electrode, content of the polyhydric alcohol polycondensate is preferably at least 0.05 parts by mass and not more than 10 parts by mass per 100 parts by mass of the positive electrode active material. Through inclusion of the polyhydric alcohol polycondensate in the slurry composition for a positive electrode in an amount within the range set forth above, the slurry composition for a positive electrode can be provided with even better dispersibility, and a secondary battery having even better output characteristics can be obtained.

In the presently disclosed slurry composition for a non-aqueous secondary battery positive electrode, the polyhydric alcohol polycondensate preferably has a weight-average molecular weight of at least 200 and not more than 5,000. When the polyhydric alcohol polycondensate in the slurry composition for a positive electrode has a molecular weight within the range set forth above, the slurry composition for a positive electrode can be provided with even better dispersibility, and a secondary battery having even better output characteristics can be obtained.

The "weight-average molecular weight" referred to in the present disclosure is a polyethylene glycol equivalent value measured by gel permeation chromatography (GPC).

In the presently disclosed slurry composition for a non-aqueous secondary battery positive electrode, percentage content of the hydroxyl group-containing monomer unit in the particulate polymer is preferably at least 0.05 mass % and not more than 5 mass %. This is because dispersibility of the slurry composition for a positive electrode can be further improved when the particulate polymer contained in the slurry composition for a positive electrode includes a hydroxyl group-containing monomer unit in a proportion within the range set forth above.

The "percentage content of a monomer unit" referred to in the present disclosure can be measured by a nuclear magnetic resonance (NMR) method such as $^1$H-NMR.

The presently disclosed slurry composition for a non-aqueous secondary battery positive electrode preferably further comprises at least one water-soluble polymer selected from the group consisting of polyvinyl alcohol, a water-soluble derivative of cellulose, and polyvinyl acetate. This is because the slurry composition for a positive electrode can be provided with even better dispersibility through further inclusion of any of the water-soluble polymers set forth above.

The term "water-soluble polymer" as used in the present disclosure refers to a polymer for which insoluble content is less than 1.0 mass % when 0.5 g of the polymer is dissolved in 100 g of water at 25° C.

A ratio $\eta 0/\eta 1$ of viscosity $\eta 0$ of the presently disclosed slurry composition for a non-aqueous secondary battery positive electrode at a shear rate of 10 s$^{-1}$ relative to viscosity $\eta 1$ of the presently disclosed slurry composition for a non-aqueous secondary battery positive electrode at a shear rate of 1,000 s$^{-1}$ is preferably at least 2 and not more than 10. When $\eta 0/\eta 1$ of the slurry composition for a positive electrode is within the range set forth above, the slurry composition for a positive electrode has good coatability when coated on a current collector to form a positive electrode mixed material layer, for example. This enables favorable production of a positive electrode and a secondary battery.

Moreover, the present disclosure aims to advantageously solve the problem set forth above by disclosing a positive electrode for a non-aqueous secondary battery obtained using any one of the slurry compositions for a non-aqueous secondary battery positive electrode set forth above. A secondary battery can be provided with excellent output characteristics by using a positive electrode obtained using any one of the slurry compositions for a non-aqueous secondary battery positive electrode set forth above.

Furthermore, the present disclosure aims to advantageously solve the problem set forth above by disclosing a non-aqueous secondary battery comprising a positive electrode, a negative electrode, a separator, and an electrolyte solution, wherein the positive electrode is the positive electrode for a non-aqueous secondary battery set forth above. A secondary battery that includes the positive electrode for a non-aqueous secondary battery set forth above as a positive electrode in this manner has excellent output characteristics.

Advantageous Effect

According to the present disclosure, it is possible to provide a slurry composition for a positive electrode that has excellent dispersibility and enables production of a secondary battery that can display good output characteristics.

Moreover, according to the present disclosure, it is possible to provide a positive electrode that enables production of a secondary battery that can display good output characteristics and also to provide a secondary battery that can display good output characteristics.

DETAILED DESCRIPTION

The following provides a detailed description of embodiments of the present disclosure.

The presently disclosed slurry composition for a non-aqueous secondary battery positive electrode can be used to obtain a positive electrode for a non-aqueous secondary battery such as a lithium ion secondary battery (for example, the presently disclosed positive electrode for a non-aqueous secondary battery). Specifically, the presently disclosed slurry composition for a non-aqueous secondary battery positive electrode can be used, for example, in formation of a positive electrode mixed material layer included in a positive electrode for a non-aqueous secondary battery. A feature of the presently disclosed non-aqueous secondary battery is the inclusion of a positive electrode for a non-aqueous secondary battery that is obtained using the presently disclosed slurry composition for a non-aqueous secondary battery positive electrode.

<Slurry Composition for Non-Aqueous Secondary Battery Positive Electrode>

A feature of the presently disclosed slurry composition for a non-aqueous secondary battery positive electrode is the inclusion of: a positive electrode active material including an iron-containing compound; a conductive material; a particulate polymer including a hydroxyl group-containing monomer unit; and a polyhydric alcohol polycondensate. As a result of the presently disclosed slurry composition for a non-aqueous secondary battery positive electrode having the specific chemical composition set forth above, the slurry composition has excellent dispersibility even though a positive electrode active material including an iron-containing compound is used. Moreover, as a result of the presently disclosed slurry composition for a non-aqueous secondary battery positive electrode having the specific chemical composition set forth above, a secondary battery including a positive electrode obtained using the slurry composition for a positive electrode can be caused to display excellent output characteristics.

<Positive Electrode Active Material>

The positive electrode active material is required to include an iron (Fe) containing compound. If the positive electrode active material did not include an iron-containing compound, it would not be possible to cause a secondary battery including a positive electrode obtained using the presently disclosed slurry composition for a non-aqueous secondary battery positive electrode to display excellent output characteristics. The positive electrode active material may be an active material that is composed of the iron-containing compound or may further include an active material that is composed of a compound that does not contain iron.

In a case in which the positive electrode active material further includes an active material that is composed of a compound that does not contain iron, the percentage content of the iron-containing compound in the positive electrode active material is normally 50 weight % or more, preferably 70 weight % or more, and more preferably 90 weight % or more. Note that the percentage content of the iron-containing compound in the positive electrode active material may be set as 100 weight %. In particular, a case in which the percentage content of the iron-containing compound in the positive electrode active material is 100 weight % is even more preferable from a viewpoint of inhibiting current collector corrosion in an aqueous system.

Examples of positive electrode active materials that include an iron-containing compound include, but are not specifically limited to, olivine-type lithium iron phosphate ($LiFePO_4$), $Li_2FeP_2O_7$, $Li_2FePO_4F$, $LiFeMnO_4$, $Li[Mn_{0.85}Fe_{0.15}]PO_4$, $Li_2FeSiO_4$, and $MgFeSiO_4$. Of these examples, $LiFePO_4$ is suitable for increasing secondary battery power and can also provide good battery life through a stable structure.

The particle diameter of the positive electrode active material, in terms of volume-average particle diameter, is preferably 1 μm or more, and is preferably 30 μm or less, and more preferably 10 μm or less. This is because aggregation of the positive electrode active material can be inhibited and dispersibility of the slurry composition for a positive electrode can be improved when the particle diameter of the positive electrode active material is at least the lower limit set forth above. Moreover, an increase in internal resistance in a secondary battery including a positive electrode obtained using the slurry composition for a positive electrode can be suppressed and the secondary battery can be caused to display even better output characteristics when the particle diameter of the positive electrode active material is not more than any of the upper limits set forth above.

The "volume-average particle diameter" referred to in the present disclosure can be determined as a particle diameter (D50) at which, in a particle diameter distribution measured by laser diffraction, cumulative volume calculated from a small diameter end of the distribution reaches 50%.

<Conductive Material>

The conductive material may be any material that displays conductivity without any specific limitations. Examples of conductive materials that may be used include particulate conductive carbon materials such as carbon black (for example, acetylene black, Ketjenblack® (Ketjenblack is a registered trademark in Japan, other countries, or both), and furnace black), graphite, and carbon flakes; fibrous conductive carbon materials such as carbon fiber, carbon nanotubes, and vapor-grown carbon fiber; and fibers and foils of various metals. Of these conductive materials, it is preferable to use at least a fibrous conductive carbon material, more preferable to use carbon black and a fibrous conductive carbon material together, even more preferable to use acetylene black and a fibrous conductive carbon material together, and particularly preferable to use acetylene black and carbon nanotubes together from a viewpoint of favorably reducing secondary battery internal resistance.

One of these conductive materials may be used individually, or two or more of these conductive materials may be used in combination.

The content of the whole conductive material in the slurry composition for a non-aqueous secondary battery positive electrode per 100 parts by mass of the positive electrode active material is preferably 0.1 parts by mass or more, more preferably 0.2 parts by mass or more, even more preferably 1 part by mass or more, and particularly preferably more than 3 parts by mass, and is preferably 10 parts by mass or less, and more preferably 8 parts by mass or less. This is because internal resistance in a secondary battery including a positive electrode obtained using the slurry composition for a positive electrode can favorably be reduced and output characteristics of the secondary battery can be improved when the content of the whole conductive material is at least any of the lower limits set forth above. Moreover, reduction of dispersibility of the slurry composition for a positive electrode can be prevented when the content of the whole conductive material is not more than any of the upper limits set forth above.

[Fibrous Conductive Carbon Material]

The fibrous conductive carbon material is preferably a fibrous conductive carbon material including carbon nanotubes. By using a fibrous conductive carbon material that includes carbon nanotubes, secondary battery internal resistance can favorably be reduced and secondary battery output characteristics can be enhanced through the high conductivity of the carbon nanotubes.

In the present disclosure, a "fibrous conductive carbon material" is taken to be a material having an aspect ratio (major diameter/minor diameter) of 5 or more. The aspect ratio of the fibrous conductive carbon material is preferably more than 10. The "aspect ratio" can be determined by observing any fibrous conductive carbon material using a scanning electron microscope (SEM), measuring the maximum diameter (major diameter) and the fiber diameter (minor diameter) in a direction orthogonal to the maximum diameter, and calculating the ratio of the major diameter and the minor diameter (major diameter/minor diameter).

In a case in which a fibrous conductive carbon material including carbon nanotubes is used, the carbon nanotubes in the fibrous conductive carbon material are not specifically limited and may be single-walled carbon nanotubes and/or multi-walled carbon nanotubes. Moreover, at least multi-walled carbon nanotubes may be used from a viewpoint of lowering production cost of the slurry composition for a positive electrode.

Note that the fibrous conductive carbon material may be purchased as a commercially available product or may be synthesized in accordance with a known method described in WO 2006/011655 A1, for example.

[[Average Fiber Diameter]]

The average fiber diameter of the fibrous conductive carbon material is preferably 0.5 nm or more, and more preferably 1 nm or more, and is normally less than 1 μm, preferably 200 nm or less, more preferably 100 nm or less, and even more preferably 30 nm or less. This is because when the average fiber diameter of the fibrous conductive carbon material is at least any of the lower limits set forth above, the excellent conductivity of the fibrous conductive carbon material can be sufficiently exploited, an increase in internal resistance of a secondary battery can be suppressed, and consequently the secondary battery can be caused to display better output characteristics. Moreover, when the average fiber diameter of the fibrous conductive carbon material is not more than any of the upper limits set forth above, the fibrous conductive carbon material can be more favorably dispersed in the slurry composition for a positive electrode, coatability of the slurry composition for a positive electrode in coating on a current collector to form a positive electrode mixed material layer, for example, can be improved, and secondary battery output characteristics can be further improved.

The "average fiber diameter" referred to in the present disclosure can be determined as a number-average diameter by measuring the diameters of 100 randomly selected fibers of the fibrous conductive carbon material using a scanning electron microscope (SEM) or a transmission electron microscope (TEM). Observation using a transmission electron microscope (TEM) is suitable, in particular, when the fibrous conductive carbon material has a small diameter. The average fiber diameter of the fibrous conductive carbon material may be adjusted by changing the production method or production conditions of the fibrous conductive carbon material. Alternatively, the average fiber diameter of the fibrous conductive carbon material may be adjusted by combining a plurality of types of fibrous conductive carbon materials obtained by different production methods.

[[Average Fiber Length]]

The average fiber length of the fibrous conductive carbon material is preferably 1 μm or more, more preferably 2 μm or more, and even more preferably 3 μm or more, and is preferably 200 μm or less, more preferably 100 μm or less, and even more preferably 30 μm or less. This is because when the average fiber length of the fibrous conductive carbon material is at least any of the lower limits set forth above, the excellent conductivity of the fibrous conductive carbon material can be sufficiently exploited, an increase in internal resistance of a secondary battery can be suppressed, and consequently the secondary battery can be caused to display even better output characteristics. Moreover, when the average fiber length of the fibrous conductive carbon material is not more than any of the upper limits set forth above, the fibrous conductive carbon material can be more favorably dispersed in the slurry composition for a positive electrode. In addition, when the average fiber length of the fibrous conductive carbon material is not more than any of the upper limits set forth above, coatability of the slurry composition for a positive electrode in coating on a current collector to form a positive electrode mixed material layer, for example, can be improved, flexibility of the formed positive electrode mixed material layer can be increased, and, as a result, secondary battery output characteristics can be further improved.

[[Specific Surface Area]]

The specific surface area of the fibrous conductive carbon material is preferably 5 $m^2/g$ or more, more preferably 20 $m^2/g$ or more, and even more preferably 100 $m^2/g$ or more, and is preferably 2,500 $m^2/g$ or less, more preferably 1,000 $m^2/g$ or less, and even more preferably 500 $m^2/g$ or less. This is because when the specific surface area of the fibrous conductive carbon material is at least any of the lower limits set forth above, an increase in internal resistance of a secondary battery can be suppressed through the excellent conductivity of the fibrous conductive carbon material, and consequently the secondary battery can be caused to display even better output characteristics. Moreover, when the specific surface area of the fibrous conductive carbon material is not more than any of the upper limits set forth above, the fibrous conductive carbon material can be more favorably dispersed in the slurry composition for a positive electrode, coatability of the slurry composition for a positive electrode in coating on a current collector to form a positive electrode mixed material layer, for example, can be improved, and secondary battery output characteristics can be further improved.

The term "BET specific surface area" as used in the present disclosure refers to nitrogen adsorption specific surface area measured by the BET method.

[[Content]]

The content of the fibrous conductive carbon material used as a conductive material per 100 parts by mass of the positive electrode active material is preferably 0.1 parts by mass or more, and more preferably 0.7 parts by mass or more, and is preferably 10 parts by mass or less, more preferably 4 parts by mass or less, and even more preferably 2 parts by mass or less. This is because the excellent conductivity of the fibrous conductive carbon material can sufficiently be exploited when the content of the fibrous conductive carbon material is at least any of the lower limits set forth above, and this can further suppress an increase in secondary battery internal resistance and further improve secondary battery output characteristics. Moreover, when the content of the fibrous conductive carbon material is not more than any of the upper limits set forth above, reduction in dispersibility of the slurry composition for a positive electrode can be inhibited while also improving coatability of the slurry composition for a positive electrode in coating on a current collector to form a positive electrode mixed material layer, for example, increasing flexibility of the formed positive electrode mixed material layer, and, as a result, further improving secondary battery output characteristics.

The percentage content of the fibrous conductive carbon material among 100 mass % of the conductive material is preferably 5 mass % or more, more preferably 12 mass % or more, and even more preferably 15 mass % or more, and is 100 mass % or less, preferably 80 mass % or less, more preferably 60 mass % or less, and even more preferably 40 mass % or less. This is because the excellent conductivity of the fibrous conductive carbon material can sufficiently be exploited when the percentage content of the fibrous conductive carbon material is at least any of the lower limits set forth above, and this can further suppress an increase in secondary battery internal resistance and further improve secondary battery output characteristics. Moreover, when the percentage content of the fibrous conductive carbon material is not more than any of the upper limits set forth above, reduction in dispersibility of the slurry composition for a positive electrode can be inhibited while also improving coatability of the slurry composition for a positive electrode in coating on a current collector to form a positive electrode mixed material layer, for example, increasing flexibility of the formed positive electrode mixed material layer, and, as a result, further improving secondary battery output characteristics.

<Particulate Polymer>

The particulate polymer contained in the presently disclosed slurry composition for a non-aqueous secondary battery positive electrode is required to include a hydroxyl group-containing monomer unit. If the particulate polymer does not include a hydroxyl group-containing monomer unit, it is not possible to provide a slurry composition for a positive electrode in which a positive electrode active material including an iron-containing compound is used with good dispersibility.

Note that in a situation in which a fibrous conductive carbon material that is difficult to disperse is used as the conductive material, the particulate polymer including the hydroxyl group-containing monomer unit can also improve dispersibility of the fibrous conductive carbon material.

The "particulate polymer" referred to in the present disclosure is normally composed of a water-insoluble polymer. When a polymer is referred to as water-insoluble, this means that when 0.5 g of the particulate polymer is dissolved in 100 g of water at 25° C., insoluble content is 90 mass % or more.

[Hydroxyl Group-Containing Monomer Unit]

Examples of hydroxyl group-containing monomers that may be used to form the hydroxyl group-containing monomer unit include, but are not specifically limited to, 2-hydroxyethyl acrylate, 2-hydroxyethyl methacrylate, 2-hydroxypropyl acrylate, 2-hydroxypropyl methacrylate, and N-methylolacrylamide. One of these hydroxyl group-containing monomers may be used individually, or two or more of these hydroxyl group-containing monomers may be used in combination. Of these hydroxyl group-containing monomers, 2-hydroxyethyl acrylate is preferable.

[[Percentage Content of Hydroxyl Group-Containing Monomer Unit]]

The percentage content of the hydroxyl group-containing monomer unit in the particulate polymer is preferably 0.05 mass % or more, more preferably 0.1 mass % or more, and even more preferably 0.2 mass % or more, and is preferably 5 mass % or less, more preferably 4 mass % or less, and even more preferably 3 mass % or less. This is because when the particulate polymer includes the hydroxyl group-containing monomer unit in a proportion that is at least any of the lower limits set forth above, dispersibility of a slurry composition for a positive electrode in which a positive electrode active material including an iron-containing compound is used can be improved, and coatability of the slurry composition for a positive electrode in coating on a current collector to form a positive electrode mixed material layer, for example, can be improved. Moreover, when the particulate polymer includes the hydroxyl group-containing monomer unit in a proportion that is not more than any of the upper limits set forth above, dispersibility and viscosity stability of the slurry composition for a positive electrode can be improved, and coatability of the slurry composition for a positive electrode in coating on a current collector to form a positive electrode mixed material layer, for example, can be improved. Furthermore, secondary battery output characteristics can be further enhanced when the percentage content of the hydroxyl group-containing monomer unit in the particulate polymer is within any of the ranges set forth above.

Any polymer such as an acrylic polymer or a conjugated diene polymer may be used as the particulate polymer without any specific limitations so long as the polymer includes a hydroxyl group-containing monomer unit. Of such polymers, an acrylic polymer is preferable as the particulate polymer.

[Acrylic Polymer]

The acrylic polymer is a polymer that includes a (meth) acrylic acid ester monomer unit. The acrylic polymer can be obtained by, for example, polymerizing a (meth)acrylic acid ester monomer that can form the (meth)acrylic acid ester monomer unit and a hydroxyl group-containing monomer that can form the hydroxyl group-containing monomer unit by any polymerization method. The acrylic polymer may optionally further include other monomer units in addition to the hydroxyl group-containing monomer unit.

Note that in the present disclosure, "(meth)acryl" is used to indicate "acryl" and/or "methacryl".

Moreover, the acrylic polymer normally includes the (meth)acrylic acid ester monomer unit in a proportion of 50 mass % or more.

[[(Meth)Acrylic Acid Ester Monomer]]

Examples of (meth)acrylic acid ester monomers that may be used include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, and octyl acrylate (for example, 2-ethylhexyl acrylate); and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, and octyl methacrylate (for example, 2-ethylhexyl methacrylate). One of these (meth) acrylic acid ester monomers may be used individually, or two or more of these (meth)acrylic acid ester monomers may be used in combination. Of these (meth)acrylic acid ester monomers, 2-ethylhexyl acrylate is preferable.

[[Other Monomers]]

Examples of other monomers that may be used in production of the acrylic polymer include monomers that are copolymerizable with the monomers set forth above. Specific examples of such other monomers include:

α,β-unsaturated nitrile monomers such as acrylonitrile and methacrylonitrile;

ethylenically unsaturated carboxylic acid monomers such as ethylenically unsaturated monocarboxylic acids (for example, acrylic acid, methacrylic acid, and crotonic acid), derivatives of ethylenically unsaturated monocarboxylic acids (for example, 2-ethylacrylic acid, isocrotonic acid, α-acetoxyacrylic acid, β-trans-aryloxyacryli c acid, α-chloro-β-E-methoxyacrylic acid, and β-diaminoacrylic acid), ethylenically unsaturated dicarboxylic acids (for example, maleic acid, fumaric acid, and itaconic acid), acid anhydrides of ethylenically unsaturated dicarboxylic acids (for example, maleic anhydride, diacrylic anhydride, methyl maleic anhydride, and dimethyl maleic anhydride), and derivatives of ethylenically unsaturated dicarboxylic acids (for example, methylmaleic acid, phenylmaleic acid, chloromaleic acid, dichloromaleic acid, and fluoromaleic acid);

sulfuric acid ester group-containing monomers such as acrylamido-2-methylpropane sulfonic acid;

amide group-containing monomers such as acrylamide and methacrylamide;

crosslinkable monomers (monomers that can crosslink) such as allyl glycidyl ether, allyl (meth)acrylate, and N-methylolacrylamide;

styrenic monomers such as styrene, chlorostyrene, vinyltoluene, t-butylstyrene, methyl vinylbenzoate, vinylnaphthalene, chloromethylstyrene, α-methylstyrene, and divinylbenzene;

olefins such as ethylene and propylene;

halogen atom-containing monomers such as vinyl chloride and vinylidene chloride;

vinyl esters such as vinyl acetate, vinyl propionate, vinyl butyrate, and vinyl benzoate;

vinyl ethers such as methyl vinyl ether, ethyl vinyl ether, and butyl vinyl ether;

vinyl ketones such as methyl vinyl ketone, ethyl vinyl ketone, butyl vinyl ketone, hexyl vinyl ketone, and isopropenyl vinyl ketone;

heterocycle-containing vinyl compounds such as N-vinylpyrrolidone, vinylpyridine, and vinylimidazole; and amino group-containing monomers such as aminoethyl vinyl ether and dimethylaminoethyl vinyl ether.

One of these other monomers may be used individually, or two or more of these other monomers may be used in combination.

[Conjugated Diene Polymer]

The conjugated diene polymer is a polymer that includes a conjugated diene monomer unit. Specific examples of the conjugated diene polymer include, but are not specifically limited to, a copolymer that includes an aromatic vinyl monomer unit and an aliphatic conjugated diene monomer unit (for example, styrene-butadiene copolymer (SBR)), butadiene rubber (BR), isoprene rubber, acrylic rubber (NBR) (copolymer including an acrylonitrile unit and a butadiene unit), and hydrogenated products thereof.

The copolymer including an aromatic vinyl monomer unit and an aliphatic conjugated diene monomer unit, for example, can be obtained by polymerizing an aromatic vinyl monomer that can form the aromatic vinyl monomer unit, an aliphatic conjugated diene monomer that can form the aliphatic conjugated diene monomer unit, and a hydroxyl group-containing monomer such as previously described by any polymerization method. The copolymer including an aromatic vinyl monomer unit and an aliphatic conjugated diene monomer unit, for example, may optionally further include other monomers in addition to the hydroxyl group-containing monomer.

[[Aromatic Vinyl Monomer]]

Examples of aromatic vinyl monomers that may be used include styrene, α-methylstyrene, vinyltoluene, and divinylbenzene. One of these aromatic vinyl monomers may be used individually, or two or more of these aromatic vinyl monomers may be used in combination. Of these aromatic vinyl monomers, styrene is preferable.

[[Aliphatic Conjugated Diene Monomer]]

Examples of aliphatic conjugated diene monomers that may be used include 1,3-butadiene, 2-methyl-1,3-butadiene, 2,3-dimethyl-1,3-butadiene, 2-chloro-1,3-butadiene, substituted linear conjugated pentadienes, and substituted and branched conjugated hexadienes. One of these aliphatic conjugated diene monomers may be used individually, or two or more of these aliphatic conjugated diene monomers may be used in combination. Of these aliphatic conjugated diene monomers, 1,3-butadiene is preferable.

[[Other Monomers]]

Examples of other monomers that may be used in production of the conjugated diene polymer include monomers that are copolymerizable with the monomers set forth above. Specific examples of such other monomers include:

ethylenically unsaturated carboxylic acid monomers such as previously described as other monomers for the acrylic polymer;

fluorine-containing monomers such as fluorine-containing (meth)acrylic acid ester monomers;

sulfuric acid ester group-containing monomers such as acrylamido-2-methylpropane sulfonic acid;

amide group-containing monomers such as acrylamide and methacrylamide;

crosslinkable monomers (monomers that can crosslink) such as allyl glycidyl ether, allyl (meth)acrylate, and N-methylolacrylamide;

olefins such as ethylene and propylene;

halogen atom-containing monomers such as vinyl chloride and vinylidene chloride;

vinyl esters such as vinyl acetate, vinyl propionate, vinyl butyrate, and vinyl benzoate;

vinyl ethers such as methyl vinyl ether, ethyl vinyl ether, and butyl vinyl ether;

vinyl ketones such as methyl vinyl ketone, ethyl vinyl ketone, butyl vinyl ketone, hexyl vinyl ketone, and isopropenyl vinyl ketone;

heterocycle-containing vinyl compounds such as N-vinylpyrrolidone, vinylpyridine, and vinylimidazole;

amino group-containing monomers such as aminoethyl vinyl ether and dimethylaminoethyl vinyl ether; and α,β-unsaturated nitrile monomers such as acrylonitrile and methacrylonitrile.

One of these other monomers may be used individually, or two or more of these other monomers may be used in combination.

[Content]

Although no specific limitations are placed on the content of the particulate polymer, from a viewpoint of ease of production, the content of the particulate polymer per 100 parts by mass of the positive electrode active material is preferably 0.3 parts by mass or more, more preferably 0.5 parts by mass or more, and even more preferably 2 parts by mass or more, and may be 30 parts by mass or less, and preferably 10 parts by mass or less. This is because good binding of components in a positive electrode mixed material layer to one another and good binding of the positive electrode mixed material layer to a current collector can be achieved when the content of the particulate polymer is at least any of the lower limits set forth above. Moreover, an increase in secondary battery internal resistance can be suppressed and better secondary battery output characteristics can be achieved when the content of the particulate polymer is not more than any of the upper limits set forth above.

[Production Method of Particulate Polymer]

The particulate polymer is obtained by, for example, using any polymerization method to polymerize a monomer composition obtained by mixing the components set forth above and any polymerization solvent by a known method. A solution such as a dispersion liquid containing the particulate polymer and polymerization solvent that is obtained through polymerization of the monomer composition may be used as obtained to produce the slurry composition for a positive electrode or may be used to produce the slurry composition for a positive electrode after being subjected to solvent replacement, addition of optional components, or the like.

The polymerization method of the particulate polymer is not specifically limited and may, for example, be any of solution polymerization (for example, aqueous solution polymerization), slurry polymerization, suspension polymerization, bulk polymerization, and emulsion polymerization. The polymerization reaction of the particulate polymer may be, for example, addition polymerization such as ionic polymerization, radical polymerization, or living radical polymerization. The polymerization may be carried out with a commonly used emulsifier, polymerization initiator, polymerization promoter, dispersant, chain transfer agent, or the like, and the amount thereof may also be the same as commonly used.

<Polyhydric Alcohol Polycondensate>

The presently disclosed slurry composition for a non-aqueous secondary battery positive electrode is required to contain a polyhydric alcohol polycondensate. If a slurry composition for a positive electrode in which a positive electrode active material including an iron-containing compound is used does not contain a polyhydric alcohol polycondensate in addition to the previously described particulate polymer including a hydroxyl group-containing monomer unit, the slurry composition for a positive electrode cannot be provided with good dispersibility, and a secondary battery obtained using the slurry composition for a positive electrode cannot be caused to display good output characteristics. Moreover, the inclusion of a polyhydric alcohol polycondensate in the slurry composition for a positive electrode can improve coatability of the slurry composition for a positive electrode in coating thereof to produce a positive electrode, for example, and can also improve smoothness and flexibility of the obtained positive electrode. Note that in a situation in which a fibrous conductive carbon material that is difficult to disperse is used as the conductive material, the polyhydric alcohol polycondensate can also improve dispersibility of the fibrous conductive carbon material.

The "polyhydric alcohol polycondensate" referred to in the present disclosure may be a homopolycondensate of one polyhydric alcohol or a polycondensate obtained through polycondensation of two or more polyhydric alcohols. However, no limitations are placed on the production method so long as the final product is a subsequently described polyether compound, and the polyhydric alcohol polycondensate may alternatively be a ring-opened polymer of a cyclic ether or the like. The polyhydric alcohol that undergoes polycondensation is normally a compound having a structure in which two or more hydrogen atoms of a hydrocarbon compound have been substituted with OH. In other words, compounds such as sugars are not considered to be included among polyhydric alcohols.

The polyhydric alcohol polycondensate is a polyether compound having a plurality of ether bonds represented by R—O—R' (R and R' may be any hydrocarbon group). Of such polyhydric alcohol polycondensates, a polycondensate of polyhydric alcohol molecules that are the same is preferable, a polycondensate of alcohol molecules for which the number of bonded hydroxyl groups is 2 or 3 (i.e., a dihydric or trihydric alcohol) is more preferable, a polycondensate of glycerin molecules (polyglycerin) or a polycondensate of ethylene glycol molecules (for example, hexaethylene glycol) is even more preferable, and a polycondensate of glycerin molecules (polyglycerin) is further preferable. This is because a polyhydric alcohol polycondensate having a structure such as described above can further improve dispersibility of a slurry composition for a positive electrode in which a positive electrode active material including an iron-containing compound is used, and can further improve flexibility of a positive electrode obtained using the slurry composition for a positive electrode and output characteristics of a secondary battery including the positive electrode.

[Molecular Weight]

The weight-average molecular weight of the polyhydric alcohol polycondensate is preferably 200 or more, more preferably 300 or more, and even more preferably 400 or more, and is preferably 5,000 or less, more preferably 2,000 or less, and even more preferably 1,000 or less. This is because flexibility of a positive electrode obtained using the slurry composition for a positive electrode can be improved when the molecular weight of the polyhydric alcohol polycondensate is at least any of the lower limits set forth above. Moreover, dispersibility of the slurry composition for a positive electrode can be improved, coatability of the slurry composition for a positive electrode in coating to form a positive electrode mixed material layer, for example, can be increased, an increase in secondary battery internal resistance can be suppressed, and secondary battery output characteristics can be further improved when the molecular weight of the polyhydric alcohol polycondensate is not more than any of the upper limits set forth above.

[Content]

The content of the polyhydric alcohol polycondensate per 100 parts by mass of the positive electrode active material is preferably 0.05 parts by mass or more, more preferably 0.1 parts by mass or more, and even more preferably 0.2 parts by mass or more, and is preferably 10 parts by mass or less, more preferably 8 parts by mass or less, and even more preferably 2 parts by mass or less. This is because dispersibility and coatability of a slurry composition for a positive electrode in which a positive electrode active material including an iron-containing compound is used can be further increased and flexibility of a positive electrode obtained using the slurry composition for a positive electrode can be further increased when the content of the polyhydric alcohol polycondensate is at least any of the lower limits set forth above. Moreover, an increase in internal resistance of a secondary battery obtained using the slurry composition for a positive electrode can be further suppressed and output characteristics of the secondary battery can be further improved when the content of the polyhydric alcohol polycondensate is not more than any of the upper limits set forth above.

In addition, the content of the polyhydric alcohol polycondensate, by mass, is preferably 0.05 times or more, more preferably 0.1 times or more, even more preferably 0.3 times or more, and further preferably 0.4 times or more the content of the previously described fibrous conductive carbon material, and is preferably 10 times or less, more preferably 5 times or less, even more preferably 4 times or less, further preferably 3 times or less, and particularly preferably 1.3 times or less the content of the previously described fibrous conductive carbon material. This is because when the content of the polyhydric alcohol polycondensate is at least any of the lower limits set forth above, dispersibility and coatability of the slurry composition for a positive electrode can be further increased and flexibility of a positive electrode obtained using the slurry composition for a positive electrode can be further increased even in a case in which the slurry composition for a positive electrode contains a fibrous conductive carbon material in addition to the positive electrode active material including the iron-containing compound. Moreover, an increase in internal resistance of a secondary battery obtained using the slurry composition for a positive electrode can be further suppressed and output characteristics of the secondary battery can be further improved when the content of the polyhydric alcohol polycondensate is not more than any of the upper limits set forth above.

The polyhydric alcohol polycondensate may be a commercially available product or may be produced by a known condensation method.

<Water-Soluble Polymer>

The presently disclosed slurry composition for a non-aqueous secondary battery positive electrode may further contain a water-soluble polymer in addition to the components set forth above.

Examples of water-soluble polymers that may be used include, but are not specifically limited to, natural polymers such as thickening polysaccharides, alginic acid, and starch; semi-synthetic polymers such as water-soluble cellulose; and synthetic polymers. Of these water-soluble polymers, semi-synthetic polymers and synthetic polymers are preferable, the use of at least one selected from the group consisting of polyvinyl alcohol, water-soluble cellulose, and polyvinyl acetate is more preferable, the use of at least one of carboxymethyl cellulose (CMC) and polyvinyl alcohol is even more preferable, and the use of CMC is further preferable. The use of any of the water-soluble polymers given as examples above can further improve dispersibility, viscosity stability, and coatability of the slurry composition for a positive electrode, flexibility of a positive electrode obtained using the slurry composition for a positive electrode, and output characteristics of a secondary battery including this positive electrode.

Although no specific limitations are placed on the content of the water-soluble polymer, the content per 100 parts by mass of the positive electrode active material may be set as at least 0.1 parts by mass and not more than 10 parts by mass, for example.

<Other Components>

The slurry composition for a non-aqueous secondary battery positive electrode may further contain other components besides the components set forth above. Any other components such as reinforcing materials, leveling agents, viscosity modifiers, and additives for electrolyte solution may be used as other components contained in the slurry composition for a positive electrode. These other components are not specifically limited so long as they do not affect battery reactions and may be commonly known components such as those described in WO 2012/115096 A1, for example. One of these components may be used individually, or two or more of these components may be used in combination in a freely selected ratio.

<Dispersion Medium>

Known dispersion media can be used as the dispersion medium of the slurry composition for a non-aqueous secondary battery positive electrode without any specific limitations. Although water is preferably used as the dispersion medium, an aqueous solution of a freely selected compound or a mixed solution of water and a small amount of an organic medium may alternatively be used.

<Production Method of Slurry Composition for Positive Electrode>

The slurry composition for a non-aqueous secondary battery positive electrode can be produced by dispersing the components described above in the dispersion medium either simultaneously or in any order. Specifically, the slurry composition for a positive electrode can be produced by mixing the components and the dispersion medium using a mixer such as a ball mill, a sand mill, a bead mill, a pigment disperser, a grinding machine, an ultrasonic disperser, a homogenizer, a planetary mixer, or a FILMIX.

<Viscosity of Slurry Composition for Positive Electrode>

A ratio $\eta 0/\eta 1$ of viscosity $\eta 0$ of the slurry composition for a non-aqueous secondary battery positive electrode at a shear rate of 10 $s^{-1}$ relative to viscosity $\eta 1$ of the slurry composition for a non-aqueous secondary battery positive electrode at a shear rate of 1,000 $s^{-1}$ is preferably 2 or more, and more preferably 3 or more, and is preferably 10 or less, more preferably 9 or less, even more preferably 8 or less, and further preferably 6 or less. This is because excessive fluidity of the slurry composition for a positive electrode during coating can be suppressed to enable good coating when the viscosity ratio $\eta 0/\eta 1$ of the slurry composition for a positive electrode is at least any of the lower limits set forth above. Moreover, coating unevenness can be suppressed to enable good coating when the viscosity ratio $\eta 0/\eta 1$ of the slurry composition for a positive electrode is not more than any of the upper limits set forth above.

The "viscosity" referred to in the present disclosure can be measured at 25° C. using a coaxial double cylinder viscometer by a method described in the EXAMPLES section of the present specification.

(Positive Electrode for Non-Aqueous Secondary Battery)

A feature of the presently disclosed positive electrode for a non-aqueous secondary battery is that the positive electrode is obtained using any one of the slurry compositions for a non-aqueous secondary battery positive electrode set forth above. The presently disclosed positive electrode for a non-aqueous secondary battery normally has a structure in which a positive electrode mixed material layer obtained using the slurry composition for a positive electrode is formed on a current collector. As a result of the presently disclosed positive electrode for a non-aqueous secondary battery being obtained using the specific slurry composition for a positive electrode set forth above, the presently disclosed positive electrode for a non-aqueous secondary battery can cause a secondary battery to display excellent output characteristics when used as a positive electrode in the secondary battery.

Note that components contained in the positive electrode mixed material layer are the same as the components that were contained in the slurry composition for a non-aqueous secondary battery positive electrode set forth above and the preferred ratio (content ratio) of these components is the same as the preferred ratio (content ratio) of the components in the slurry composition for a positive electrode. In other words, the presently disclosed positive electrode for a non-aqueous secondary battery preferably contains the positive electrode active material including the iron-containing compound, the conductive material, a polymer originating from the particulate polymer including the hydroxyl group-containing monomer unit, and the polyhydric alcohol polycondensate in the same ratio as the preferred ratio (content ratio) of these components set forth above. Also note that the particulate polymer does not have to maintain a particulate form in the positive electrode for a non-aqueous secondary battery.

<Current Collector>

The current collector is a material having electrical conductivity and electrochemical durability. Specifically, the current collector may, for example, be made of a metal material such as iron, copper, aluminum, nickel, stainless steel, titanium, tantalum, gold, or platinum. One of these materials may be used individually, or two or more of these materials may be used in combination in a freely selected ratio.

<Positive Electrode Mixed Material Layer>

The positive electrode mixed material layer is formed through a step of applying the slurry composition for a non-aqueous secondary battery positive electrode (application step) and a step of drying the applied slurry composition for a non-aqueous secondary battery positive electrode (drying step), for example.

[Application Step]

The method by which the slurry composition for a non-aqueous secondary battery positive electrode is applied onto a current collector, for example, may be a commonly known method without any specific limitations. Specific examples of application methods that can be used include doctor blading, dip coating, reverse roll coating, direct roll coating, gravure coating, extrusion coating, and brush coating. The slurry composition for a positive electrode may be applied onto one side or both sides of the current collector. The thickness of a film of the slurry composition for a positive electrode on the current collector after application but before drying may be set as appropriate in accordance with the thickness of the positive electrode mixed material layer to be obtained after drying.

[Drying Step]

The slurry composition for a positive electrode that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition for a positive electrode that has been applied onto the current collector in this manner, a positive electrode mixed material layer can be formed on the current collector to thereby obtain a positive electrode including the current collector and the positive electrode mixed material layer.

After the drying step, the positive electrode mixed material layer may be further subjected to a pressing process such as mold pressing or roll pressing. The pressing process can improve the close adherence between the positive electrode mixed material layer and the current collector. When the positive electrode mixed material layer is formed using the presently disclosed slurry composition for a non-aqueous secondary battery positive electrode, a positive electrode that has excellent flexibility even after undergoing pressing can be obtained.

(Non-Aqueous Secondary Battery)

The presently disclosed non-aqueous secondary battery includes a positive electrode, a negative electrode, a separator, and an electrolyte solution, and a feature thereof is that the positive electrode is the presently disclosed positive electrode for a non-aqueous secondary battery set forth above. The negative electrode may be a known negative electrode. The presently disclosed non-aqueous secondary battery has excellent output characteristics as a result of including the presently disclosed positive electrode for a non-aqueous secondary battery as a positive electrode.

Although the following describes, as one example, a case in which the non-aqueous secondary battery is a lithium ion secondary battery, the presently disclosed non-aqueous secondary battery is not limited to the following example.

<Negative Electrode>

The negative electrode may normally be a known negative electrode. In formation of a known negative electrode, a chemical composition and formation method such as described in JP 2016-149313 A, for example, may be adopted.

<Separator>

Examples of separators that may be used include, but are not specifically limited to, a microporous membrane obtained using a polyolefinic resin (polyethylene, polypropylene, polybutene, or polyvinyl chloride), a microporous membrane obtained using a resin of polyethylene terephthalate, polycycloolefin, polyethersulfone, polyamide, polyimide, polyimide-amide, polyaramid, polycycloolefin, nylon, polytetrafluoroethylene, or the like, woven or non-woven fabric obtained using polyolefinic fibers, and an aggregate of particles formed from an insulating substance. Of these separators, a microporous membrane obtained using polyolefinic (polyethylene, polypropylene, polybutene, or polyvinyl chloride) resin is preferable because such a membrane can reduce the total thickness of the separator, which increases the ratio of electrode mixed material layer in the non-aqueous secondary battery, and consequently increases the capacity per volume. In particular, a microporous membrane made from polypropylene resin is more preferable.

<Electrolyte Solution>

The electrolyte solution may be formed by dissolving an electrolyte in a solvent.

The solvent may be an organic solvent in which the electrolyte can dissolve. Specific examples of suitable solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Known additives such as vinylene carbonate (VC), fluoroethylene carbonate (FEC), and ethyl methyl sulfone may be added to the solvent.

The electrolyte may be a lithium salt. Examples of lithium salts that may be used include compounds described in JP 2012-204303 A, for example. Of these lithium salts, $LiPF_6$, $LiClO_4$, and $CF_3SO_3Li$ are preferable as the electrolyte since they readily dissolve in organic solvents and display a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

<Battery Assembly>

The presently disclosed non-aqueous secondary battery can be produced using a known assembly method without any specific limitations. Specifically, the presently disclosed non-aqueous secondary battery can be produced by, for example, performing rolling, folding, or the like of the positive electrode obtained as described above, the negative electrode, and the separator in accordance with the battery shape as necessary to place these components in a battery container, injecting the electrolyte solution into the battery container, and sealing the battery container. In order to prevent pressure increase inside the non-aqueous secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a repeating unit (monomer unit) that is formed through polymerization of a given monomer in the polymer is normally, unless otherwise specified, the same as the ratio (charging ratio) of the given monomer among all monomers used in polymerization of the polymer.

The following methods were used to measure and evaluate the molecular weight of a polyhydric alcohol polycondensate, the viscosity, viscosity ratio, dispersibility, and coatability of a slurry composition for a positive electrode, the flexibility of a positive electrode, and the output characteristics of a lithium ion secondary battery.

<Molecular Weight>

The molecular weight of a polyhydric alcohol polycondensate was determined as a polyethylene glycol equivalent weight-average molecular weight using a gel permeation chromatography (GPC) analyzer (produced by Showa Denko K.K.; column: SB-802.5HQ, SB-802HQ; eluent: distilled water).

Note that determination of the polyethylene glycol equivalent value was carried out using a calibration curve obtained by measuring polyethylene glycol of differing molecular weights as standard samples.

<Viscosity and Viscosity Ratio>

The viscosity ($\eta 0$, $\eta 1$) of a slurry composition for a positive electrode was measured by measuring both the viscosity $\eta 0$ (mPa·s) at a shear rate of $10\ s^{-1}$ and the viscosity $\eta 1$ (mPa·s) at a shear rate of $1{,}000\ s^{-1}$ at 25° C. using a coaxial double cylinder viscometer (DV-II+Pro (product name) produced by Brookfield Engineering).

The viscosities $\eta 0$ and $\eta 1$ obtained as described above were used to calculate a viscosity ratio $\eta 0/\eta 1$ of the slurry composition for a positive electrode.

<Dispersibility>

The dispersibility of a slurry composition for a positive electrode was measured in accordance with JIS K 5600-2-5 using a fineness of grind gauge (groove depth: 0 μm to 100 μm). The dispersibility was evaluated in accordance with the following standard.

A smaller particle diameter as measured as described above indicates higher fineness of grind and better dispersibility of the slurry composition for a positive electrode.

A: Particle diameter of less than 40 μm
B: Particle diameter of at least 40 μm and less than 60 μm
C: Particle diameter of at least 60 μm and less than 90 μm
D: Particle diameter of 90 μm or more <Coatability>

The coatability of a slurry composition for a positive electrode was evaluated using a smoothness index of a positive electrode mixed material layer formed using the slurry composition for a positive electrode. Specifically, the coatability was evaluated using a smoothness index calculated from thickness (layer thickness) with respect to a pre-roll pressing positive electrode web including a positive electrode mixed material layer formed on a current collector using the slurry composition for a positive electrode. More specifically, layer thickness was first measured at 10 arbitrary end part locations that were within 2 cm of width direction ends of the pre-roll pressing positive electrode web and an average value thereof (end part average layer thickness) was calculated. Layer thickness was also measured at 10 arbitrary central part locations within 2 cm to both sides of the width direction center of the same pre-roll pressing positive electrode web and an average value thereof (central part average layer thickness) was calculated. The following formula (1):

$$\text{Smoothness index (\%)} = (|\text{End part average layer thickness} - \text{Central part average layer thickness}|/\text{Central part average layer thickness}) \times 100 \qquad (1)$$

was used to calculate the smoothness index (i.e., the ratio of magnitude of an absolute value of the difference between the end part average layer thickness and the central part average layer thickness relative to the central part average layer thickness, expressed as a percentage). The smoothness index was evaluated in accordance with the following standard.

A smaller smoothness index value indicates higher smoothness of the positive electrode mixed material layer and better coatability of the slurry composition for a positive electrode.

A: Smoothness index of less than 4%
B: Smoothness index of at least 4% and less than 10%
C: Smoothness index of 10% or more <Flexibility>

The flexibility of a positive electrode was evaluated through the presence of cracks and splits in a pre-roll pressing positive electrode web. Specifically, the state of cracks and splits in the positive electrode web was inspected in accordance with the evaluation standard of JIS K5600-8-4 as indicated below.

Lower visibility of cracks and splits indicates better positive electrode flexibility.

A: Not visible even at ×2 magnification
B: Visible over less than 5% of surface at ×2 magnification
C: Just about recognizable with normal corrected vision
D: Clearly recognizable with normal corrected vision
E: Large cracks typically reaching 1 mm in width <Output Characteristics>

Output characteristics of a lithium ion secondary battery were evaluated as follows.

An obtained lithium ion secondary battery was charged to 3.9 V by a constant-current method at a charge rate of 0.2C and subsequently discharged to 2.5 V at a discharge rate of 0.2C in an environment having a temperature of 25° C. in order to determine the battery capacity in 0.2C discharging. Next, the lithium ion secondary battery was charged to 3.9 V by a constant-current method at a charge rate of 0.2C and subsequently discharged to 2.5 V at a discharge rate of 2C in order to determine the battery capacity in 2C discharging. This measurement was carried out in the same way with respect to 10 lithium ion secondary batteries to determine an average value of battery capacity in 0.2C discharging (Cap0.2C) and an average value of battery capacity in 2C discharging (Cap2C). The following formula (2):

$$\text{Capacity maintenance rate in } 2C \text{ discharging } (\%) = (Cap2C/Cap0.2C) \times 100 \qquad (2)$$

was used to determine the capacity maintenance rate in 2C discharging, which is Cap2C as a proportion relative to Cap0.2C. Output characteristics were evaluated by the following standard.

A higher capacity maintenance rate in 2C discharging indicates higher discharge capacity in high-rate discharging and better lithium ion secondary battery output characteristics.

A: Capacity maintenance rate in 2C discharging of 95% or more

B: Capacity maintenance rate in 2C discharging of at least 80% and less than 95%

C: Capacity maintenance rate in 2C discharging of at least 70% and less than 80%

D: Capacity maintenance rate in 2C discharging of less than 70%

Example 1

<Production of Particulate Polymer>

A polymerization can A was charged with 83.7 parts of deionized water, 0.2 parts of sodium dodecyl diphenyl ether sulfonate as an emulsifier, and 1.0 parts of ammonium persulfate as a polymerization initiator. These materials were heated to 70° C. and were then stirred for 30 minutes at 70° C.

Next, 75.0 parts of 2-ethylhexyl acrylate as a (meth) acrylic acid ester monomer, 22 parts of acrylonitrile and 2.0 parts of itaconic acid as other monomers, 1.0 parts of 2-hydroxyethyl acrylate as a hydroxyl group-containing monomer, 0.8 parts of sodium dodecyl diphenyl ether sulfonate as an emulsifier, and 74 parts of deionized water were charged to a separate polymerization can B and were stirred at 25° C. to obtain an emulsion. The obtained emulsion was gradually added to the polymerization can A from the polymerization can B over approximately 200 minutes, and was then stirred for approximately 180 minutes. The mixture was then cooled to end the reaction once the monomer conversion rate had reached 97% or higher. Thereafter, the pH was adjusted using 4% sodium hydroxide aqueous solution, and thermal-vacuum distillation was performed to remove unreacted monomer and thereby yield a water dispersion of a particulate polymer that was an acrylic polymer including a hydroxyl group-containing monomer unit.

<Production of Slurry Composition for Positive Electrode>

A planetary mixer equipped with a disper blade was charged with 100 parts of olivine-type lithium iron phosphate (LiFePO$_4$; SFCM (product name) produced by Formasa; volume-average particle diameter: 5 µm) as a positive electrode active material, 4.0 parts of acetylene black (DENKA BLACK HS-100 (product name) produced by Denki Kagaku Kogyo Kabushiki Kaisha; volume-average particle diameter: 35 nm) as a conductive material other than a fibrous conductive carbon material, 1.0 parts of a conductive material that was a fibrous conductive carbon material (FloTube 9110 (product name) produced by CNano Technology Limited; multi-walled carbon nanotubes; average fiber diameter: 10 nm; average fiber length: 10 µm; specific surface area: 200 m$^2$/g), 1.0 parts in terms of solid content of carboxymethyl cellulose (Daicell 2200 (product name) produced by Daicel Corporation; degree of etherification: 0.8 to 1.0) as a water-soluble polymer, and an appropriate amount of water. These materials were stirred for 60 minutes at 25° C.

The resultant mixture was mixed for 30 minutes using a homo mixer. Thereafter, 4.0 parts in terms of solid content of the water dispersion of the particulate polymer obtained as described above, 0.7 parts in terms of solid content of polyglycerin (POLYGLYCERIN #500 (product name) produced by Sakamoto Yakuhin Kogyo Co., Ltd.; weight-average molecular weight: 500) as a polyhydric alcohol polycondensate, and an appropriate amount of water were added, the solid content concentration was adjusted to 58%, and then a further 20 minutes of mixing was carried out to yield a dispersion liquid. The resultant dispersion liquid was subjected to a defoaming process under reduced pressure to yield a slurry composition for a lithium ion secondary battery positive electrode.

The obtained slurry composition for a positive electrode was used to measure and evaluate viscosity, viscosity ratio, and dispersibility by the previously described methods. The results are shown in Table 1.

<Production of Positive Electrode>

A comma coater was used to apply the slurry composition for a lithium ion secondary battery positive electrode obtained as described above onto aluminum foil (thickness: 20 µm) serving as a current collector such that the thickness of a positive electrode mixed material layer obtained after drying was approximately 70 µm. The aluminum foil onto which the slurry composition for a lithium ion secondary battery positive electrode had been applied was then conveyed inside an oven for 2 minutes at a temperature of 60° C. and a speed of 0.5 m/min, and was also conveyed inside an oven for 2 minutes at 120° C. to perform heat treatment and thereby obtain a pre-roll pressing positive electrode web.

The obtained pre-roll pressing positive electrode web was used to evaluate coatability by the previously described method. The results are shown in Table 1.

The obtained positive electrode web was then rolled by roll pressing to produce a positive electrode for a lithium ion secondary battery including a positive electrode mixed material layer of 60 µm in thickness.

The obtained positive electrode for a lithium ion secondary battery was used to evaluate flexibility by the previously described method. The results are shown in Table 1.

<Production of Negative Electrode>

A planetary mixer equipped with a disper blade was charged with 100 parts of artificial graphite (volume-average particle diameter: 24.5 µm; specific surface area: 4 m$^2$/g) as a negative electrode active material and 2.0 parts in terms of solid content of carboxymethyl cellulose (Daicel 2200 (product name) produced by Daicel Corporation; degree of etherification: 0.8 to 1.0) as a viscosity modifier. An appropriate amount of deionized water was added and then mixing was performed for 60 minutes at 25° C. The solid content concentration was adjusted to 52% with deionized water and then a further 15 minutes of mixing was performed at 25° C. to yield a mixture. Deionized water and 2 parts of a solution of styrene-butadiene copolymer (volume-average particle diameter: 140 nm; glass-transition temperature: 10° C.) having a solid content concentration of 40% were added to the obtained mixture, the final solid content concentration was adjusted to 42%, and a further 10 minutes of mixing was performed to yield a dispersion liquid. The obtained dispersion liquid was subjected to a defoaming process under reduced pressure to yield a slurry composition for a lithium ion secondary battery negative electrode.

A comma coater was then used to apply the obtained slurry composition for a lithium ion secondary battery negative electrode onto copper foil (thickness: 20 μm) serving as a current collector such that the thickness of a negative electrode mixed material layer obtained after drying was approximately 60 μm. The copper foil onto which the slurry composition for a lithium ion secondary battery negative electrode had been applied was then conveyed inside an oven for 2 minutes at a temperature of 60° C. and a speed of 0.5 m/min, and was also conveyed inside an oven for 2 minutes at 120° C. to perform heat treatment and thereby obtain a pre-roll pressing negative electrode web.

The obtained negative electrode web was then rolled by roll pressing to produce a negative electrode for a lithium ion secondary battery including a negative electrode mixed material layer of 30 μm in thickness.

<Production of Lithium Ion Secondary Battery>

The positive electrode for a lithium ion secondary battery produced as described above was positioned with the surface of the current collector in contact with an aluminum packing case. A single-layer polypropylene separator (width: 65 mm; length: 500 mm; thickness: 25 μm; porosity: 55%) made by a dry method was positioned on the surface at the positive electrode mixed material layer side of the positive electrode. In addition, the negative electrode for a lithium ion secondary battery obtained as described above was positioned on the separator such that a surface at the negative electrode mixed material layer side of the negative electrode faced toward the separator. The inside of the aluminum packing was then filled with a $LiPF_6$ solution of 1.0 M in concentration (solvent: mixed solvent of ethylene carbonate/ethyl methyl carbonate=3/7 (volume ratio); additive: 2 volume % (volume ratio) of vinylene carbonate) as an electrolyte solution. Heat sealing was performed at 150° C. to tightly seal an opening of the aluminum packing and thereby produce a lithium ion secondary battery.

The obtained lithium ion secondary battery was used to evaluate output characteristics by the previously described method. The results are shown in Table 1.

Example 2

A particulate polymer, a slurry composition for a positive electrode, a positive electrode, a negative electrode, and a secondary battery were produced in the same way as in Example 1 with the exception that olivine-type lithium iron phosphate ($LiFePO_4$) having a volume-average particle diameter of 2 μm (SFCM3005E (product name) produced by Formasa) was used instead of olivine-type lithium iron phosphate ($LiFePO_4$) having a volume-average particle diameter of 5 (SFCM (product name) produced by Formasa) as a positive electrode active material in production of the slurry composition for a positive electrode.

Measurements and evaluations were performed by the same methods as in Example 1. The results are shown in Table 1.

Example 3

A particulate polymer, a slurry composition for a positive electrode, a positive electrode, a negative electrode, and a secondary battery were produced in the same way as in Example 1 with the exception that Ketjenblack® (CARBON ECP (product name) produced by Lion Specialty Chemicals Co., Ltd.; volume-average particle diameter: 40 nm) was used instead of acetylene black (DENKA BLACK HS-100 (product name) produced by Denki Kagaku Kogyo Kabushiki Kaisha; volume-average particle diameter: 35 nm) in production of the slurry composition for a positive electrode.

Measurements and evaluations were performed by the same methods as in Example 1. The results are shown in Table 1.

Example 4

A particulate polymer, a slurry composition for a positive electrode, a positive electrode, a negative electrode, and a secondary battery were produced in the same way as in Example 1 with the exception that a fibrous conductive carbon material of the product "VGCF®-H" (VGCF is a registered trademark in Japan, other countries, or both; multi-walled carbon nanotubes produced by Showa Denko K.K.; average fiber diameter: 150 nm; average fiber length: 10 μm; specific surface area: 13 $m^2/g$) was used instead of a fibrous conductive carbon material of the product "Flo-Tube 9110" (multi-walled carbon nanotubes produced by CNano Technology Limited; average fiber diameter: 10 nm; average fiber length: 10 μm; specific surface area: 200 $m^2/g$) in production of the slurry composition for a positive electrode.

Measurements and evaluations were performed by the same methods as in Example 1. The results are shown in Table 1.

Example 5

A particulate polymer, a slurry composition for a positive electrode, a positive electrode, a negative electrode, and a secondary battery were produced in the same way as in Example 1 with the exception that in production of the slurry composition for a positive electrode, the amount of acetylene black was changed to 4.5 parts and the amount of the fibrous conductive carbon material was changed to 0.5 parts.

Measurements and evaluations were performed by the same methods as in Example 1. The results are shown in Table 1.

Example 6

A particulate polymer, a slurry composition for a positive electrode, a positive electrode, a negative electrode, and a secondary battery were produced in the same way as in Example 1 with the exception that in production of the slurry composition for a positive electrode, the amount of acetylene black was changed to 2.5 parts and the amount of the fibrous conductive carbon material was changed to 2.5 parts.

Measurements and evaluations were performed by the same methods as in Example 1. The results are shown in Table 1.

Example 7

A particulate polymer, a slurry composition for a positive electrode, a positive electrode, a negative electrode, and a secondary battery were produced in the same way as in Example 1 with the exception that in production of the slurry composition for a positive electrode, the amount of acetylene black was changed to 0.5 parts and the amount of the fibrous conductive carbon material was changed to 4.5 parts.

Measurements and evaluations were performed by the same methods as in Example 1. The results are shown in Table 1.

Example 8

A particulate polymer, a slurry composition for a positive electrode, a positive electrode, a negative electrode, and a secondary battery were produced in the same way as in Example 1 with the exception that in production of the particulate polymer, the amount of 2-hydroxyethyl acrylate was changed to 0.1 parts and the amount of 2-ethylhexyl acrylate was changed to 75.9 parts.

Measurements and evaluations were performed by the same methods as in Example 1. The results are shown in Table 1.

Example 9

A particulate polymer, a slurry composition for a positive electrode, a positive electrode, a negative electrode, and a secondary battery were produced in the same way as in Example 1 with the exception that in production of the particulate polymer, the amount of 2-hydroxyethyl acrylate was changed to 4.0 parts and the amount of 2-ethylhexyl acrylate was changed to 72 parts.

Measurements and evaluations were performed by the same methods as in Example 1. The results are shown in Table 1.

Example 10

A particulate polymer, a slurry composition for a positive electrode, a positive electrode, a negative electrode, and a secondary battery were produced in the same way as in Example 1 with the exception that a conjugated diene polymer was produced as described below instead of the acrylic polymer in production of the particulate polymer.

Measurements and evaluations were performed by the same methods as in Example 1. The results are shown in Table 1.

<Production of Particulate Polymer>

A 5 MPa pressure vessel equipped with a stirrer was charged with 63 parts of styrene as an aromatic vinyl monomer, 32.5 parts of 1,3-butadiene as an aliphatic conjugated diene monomer, 3.5 parts of itaconic acid as another monomer, 1.0 parts of 2-hydroxyethyl acrylate as a hydroxyl group-containing monomer, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. These materials were sufficiently stirred and were then heated to 55° C. to initiate polymerization. Cooling was performed to terminate the reaction once monomer consumption had reached 95.0%. Thereafter, the pH was adjusted to 8.0 through addition of 4% sodium hydroxide aqueous solution, and thermal-vacuum distillation was performed to remove unreacted monomer. Cooling was then performed to 30° C. or lower to yield a water dispersion of a particulate polymer that was a conjugated diene polymer including a hydroxyl group-containing monomer unit (styrene-butadiene copolymer).

Example 11

A particulate polymer, a slurry composition for a positive electrode, a positive electrode, a negative electrode, and a secondary battery were produced in the same way as in Example 1 with the exception that polyglycerin having a weight-average molecular weight of 750 (POLYGLYCERIN #750 (product name) produced by Sakamoto Yakuhin Kogyo Co., Ltd.) was used instead of polyglycerin having a weight-average molecular weight of 500 (POLYGLYCERIN #500 (product name) produced by Sakamoto Yakuhin Kogyo Co., Ltd.) as a polyhydric alcohol polycondensate in production of the slurry composition for a positive electrode.

Measurements and evaluations were performed by the same methods as in Example 1. The results are shown in Table 1.

Example 12

A particulate polymer, a slurry composition for a positive electrode, a positive electrode, a negative electrode, and a secondary battery were produced in the same way as in Example 1 with the exception that 1.0 parts in terms of solid content of hexaethylene glycol (Hexaethylene Glycol (product name) produced by Tokyo Chemical Industry Co., Ltd.; weight-average molecular weight: 282) was used instead of 0.7 parts in terms of solid content of polyglycerin (POLYGLYCERIN #500 (product name) produced by Sakamoto Yakuhin Kogyo Co., Ltd.; weight-average molecular weight: 500) as a polyhydric alcohol polycondensate in production of the slurry composition for a positive electrode.

Measurements and evaluations were performed by the same methods as in Example 1. The results are shown in Table 1.

Example 13

A particulate polymer, a slurry composition for a positive electrode, a positive electrode, a negative electrode, and a secondary battery were produced in the same way as in Example 1 with the exception that the amount of polyglycerin used as a polyhydric alcohol polycondensate in production of the slurry composition for a positive electrode was changed to 0.1 parts in terms of solid content.

Measurements and evaluations were performed by the same methods as in Example 1. The results are shown in Table 1.

Example 14

A particulate polymer, a slurry composition for a positive electrode, a positive electrode, a negative electrode, and a secondary battery were produced in the same way as in Example 1 with the exception that the amount of polyglycerin used as a polyhydric alcohol polycondensate in production of the slurry composition for a positive electrode was changed to 5.0 parts in terms of solid content.

Measurements and evaluations were performed by the same methods as in Example 1. The results are shown in Table 1.

Example 15

A particulate polymer, a slurry composition for a positive electrode, a positive electrode, a negative electrode, and a secondary battery were produced in the same way as in Example 1 with the exception that polyvinyl alcohol (JC-25 (product name) produced by Japan VAM & POVAL Co., Ltd.; degree of saponification: 99.0%) was used instead of carboxymethyl cellulose as a water-soluble polymer in production of the slurry composition for a positive electrode.

Measurements and evaluations were performed by the same methods as in Example 1. The results are shown in Table 1.

Example 16

A particulate polymer, a slurry composition for a positive electrode, a positive electrode, a negative electrode, and a secondary battery were produced in the same way as in Example 1 with the exception that in production of the slurry composition for a positive electrode, a fibrous conductive carbon material was not used and the amount of acetylene black was changed to 5.0 parts.

Measurements and evaluations were performed by the same methods as in Example 1. The results are shown in Table 1.

Example 17

A particulate polymer, a slurry composition for a positive electrode, a positive electrode, a negative electrode, and a secondary battery were produced in the same way as in Example 1 with the exception that the amount of acetylene black was changed to 2.0 parts in production of the slurry composition for a positive electrode.

Measurements and evaluations were performed by the same methods as in Example 1. The results are shown in Table 1.

Comparative Example 1

A particulate polymer, a slurry composition for a positive electrode, a positive electrode, a negative electrode, and a secondary battery were produced in the same way as in Example 1 with the exception that lithium-containing cobalt oxide ($LiCoO_2$; XD-20a (product name) produced by Umicore; volume-average particle diameter: 15 μm) was used instead of olivine-type lithium iron phosphate as a positive electrode active material in production of the slurry composition for a positive electrode.

Measurements and evaluations were performed by the same methods as in Example 1. The results are shown in Table 2.

Comparative Example 2

A particulate polymer, a slurry composition for a positive electrode, a positive electrode, a negative electrode, and a secondary battery were produced in the same way as in Example 1 with the exception that lithium nickel manganese cobalt composite oxide was used instead of olivine-type lithium iron phosphate as a positive electrode active material in production of the slurry composition for a positive electrode.

Measurements and evaluations were performed by the same methods as in Example 1. The results are shown in Table 2.

Comparative Example 3

A particulate polymer and a slurry composition for a positive electrode were produced in the same way as in Example 1 with the exception that in production of the particulate polymer, 2-hydroxyethyl acrylate was not used and the amount of 2-ethylhexyl acrylate was changed to 76 parts. Therefore, the particulate polymer produced in Comparative Example 3 was a polymer that did not include a hydroxyl group-containing monomer unit.

The dispersibility of the slurry composition for a positive electrode was measured and evaluated by the same method as in Example 1. The results are shown in Table 2. However, the slurry composition for a positive electrode in Comparative Example 3 was not used to produce a positive electrode and a secondary battery because the slurry composition for a positive electrode had remarkably low dispersibility.

Comparative Example 4

A particulate polymer, a slurry composition for a positive electrode, a positive electrode, a negative electrode, and a secondary battery were produced in the same way as in Example 1 with the exception that in production of the particulate polymer, 2-hydroxyethyl acrylate was not used and the amount of 2-ethylhexyl acrylate was changed to 76 parts, and in production of the slurry composition for a positive electrode, a fibrous conductive carbon material was not used and the amount of acetylene black was changed to 5.0 parts. Therefore, the particulate polymer produced in Comparative Example 4 was a polymer that did not include a hydroxyl group-containing monomer unit.

Measurements and evaluations were performed by the same methods as in Example 1. The results are shown in Table 2.

Comparative Example 5

A particulate polymer, a slurry composition for a positive electrode, a positive electrode, a negative electrode, and a secondary battery were produced in the same way as in Example 1 with the exception that a polyhydric alcohol polycondensate was not used in production of the slurry composition for a positive electrode.

Measurements and evaluations were performed by the same methods as in Example 1. The results are shown in Table 2.

In the following tables:

"LFP" indicates olivine-type lithium iron phosphate ($LiFePO_4$);

"LCO" indicates lithium-containing cobalt oxide ($LiCoO_2$);

"NMC" indicates lithium nickel manganese cobalt composite oxide;

"ACB" indicates acetylene black;

"KB" indicates Ketjenblack®;

"2-HEA" indicates 2-hydroxyethyl acrylate monomer unit;

"2-EHA" indicates 2-ethylhexyl acrylate monomer unit;

"AN" indicates acrylonitrile monomer unit;

"ST" indicates styrene monomer unit;

"BD" indicates 1,3-butadiene monomer unit;
"IA" indicates itaconic acid monomer unit;
"PG" indicates polyglycerin;
"HEG" indicates hexaethylene glycol;
"CMC" indicates carboxymethyl cellulose; and
"PVA" indicates polyvinyl alcohol.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Positive electrode active material | | Type | LFP | LFP | LFP | LFP | LFP | LFP | LFP | LFP | LFP |
| | | Volume-average particle diameter [μm] | 5 | 2 | 5 | 5 | 5 | 5 | 5 | 5 | 5 |
| | | Content [parts by mass] | 100 | 100 | 100 | 100 | 100 | 100 | 100 | 100 | 100 |
| Conductive material | Fibrous conductive carbon material | Average fiber diameter [nm] | 10 | 10 | 10 | 150 | 10 | 10 | 10 | 10 | 10 |
| | | Average fiber length [μm] | 10 | 10 | 10 | 10 | 10 | 10 | 10 | 10 | 10 |
| | | Content [parts by mass] | 1 | 1 | 1 | 1 | 0.5 | 2.5 | 4.5 | 1 | 1 |
| | | Percentage content among conductive material [mass %] | 20 | 20 | 20 | 20 | 10 | 50 | 90 | 20 | 20 |
| | Conductive material other than fibrous conductive carbon material | Type | ACB | ACB | KB | ACB | ACB | ACB | ACB | ACB | ACB |
| | | Content [parts by mass] | 4 | 4 | 4 | 4 | 4.5 | 2.5 | 0.5 | 4 | 4 |
| | | Content [parts by mass] | 5 | 5 | 5 | 5 | 5 | 5 | 5 | 5 | 5 |
| Particulate polymer | Hydroxyl group-containing monomer unit | Type | 2-HEA | 2-HEA | 2-HEA | 2-HEA | 2-HEA | 2-HEA | 2-HEA | 2-HEA | 2-HEA |
| | | Percentage content in particulate polymer [mass %] | 1 | 1 | 1 | 1 | 1 | 1 | 1 | 0.1 | 4 |
| | Percentage content of other monomer units in particulate polymer [mass %] | Type 2-EHA | 75 | 75 | 75 | 75 | 75 | 75 | 75 | 75.9 | 72 |
| | | AN | 22 | 22 | 22 | 22 | 22 | 22 | 22 | 22 | 22 |
| | | ST | — | — | — | — | — | — | — | — | — |
| | | BD | — | — | — | — | — | — | — | — | — |
| | | IA | 2 | 2 | 2 | 2 | 2 | 2 | 2 | 2 | 2 |
| | | Content [parts by mass] | 4 | 4 | 4 | 4 | 4 | 4 | 4 | 4 | 4 |
| Polyhydric alcohol polycondensate | | Type | PG | PG | PG | PG | PG | PG | PG | PG | PG |
| | | Weight-average molecular weight | 500 | 500 | 500 | 500 | 500 | 500 | 500 | 500 | 500 |
| | | Content [parts by mass] | 0.7 | 0.7 | 0.7 | 0.7 | 0.7 | 0.7 | 0.7 | 0.7 | 0.7 |
| | | Content [times content of fibrous conductive carbon material] | 0.7 | 0.7 | 0.7 | 0.7 | 1.4 | 0.3 | 0.2 | 0.7 | 0.7 |
| Water-soluble polymer | | Type | CMC | CMC | CMC | CMC | CMC | CMC | CMC | CMC | CMC |
| | | Content [parts by mass] | 1 | 1 | 1 | 1 | 1 | 1 | 1 | 1 | 1 |
| | | η1 [mPa · s] | 820 | 850 | 820 | 820 | 810 | 850 | 870 | 850 | 860 |
| | | η0/η1 [-] | 5 | 6 | 5 | 5 | 4 | 7 | 9 | 7 | 8 |
| Evaluation | | Dispersibility of slurry composition for positive electrode | A | A | A | B | A | B | B | B | B |
| | | Coatability of slurry composition for positive electrode | A | A | A | B | A | B | C | B | B |
| | | Flexibilty of positive electrode | A | A | A | A | A | B | B | A | A |
| | | Output characteristics of secondary battery | A | A | B | B | B | B | B | B | B |

| | | | Example 10 | Example 11 | Example 12 | Example 13 | Example 14 | Example 15 | Example 16 | Example 17 |
|---|---|---|---|---|---|---|---|---|---|---|
| Positive electrode active material | | Type | LFP | LFP | LFP | LFP | LFP | LFP | LFP | LFP |
| | | Volume-average particle diameter [μm] | 5 | 5 | 5 | 5 | 5 | 5 | 5 | 5 |
| | | Content [parts by mass] | 100 | 100 | 100 | 100 | 100 | 100 | 100 | 100 |
| Conductive material | Fibrous conductive carbon material | Average fiber diameter [nm] | 10 | 10 | 10 | 10 | 10 | 10 | — | 10 |
| | | Average fiber length [μm] | 10 | 10 | 10 | 10 | 10 | 10 | | 10 |
| | | Content [parts by mass] | 1 | 1 | 1 | 1 | 1 | 1 | | 1 |
| | | Percentage content among conductive material [mass %] | 20 | 20 | 20 | 20 | 20 | 20 | | 33.3 |
| | Conductive material other than fibrous conductive carbon material | Type | ACB | ACB | ACB | ACB | ACB | ACB | ACB | ACB |
| | | Content [parts by mass] | 4 | 4 | 4 | 4 | 4 | 4 | 5 | 2 |

TABLE 1-continued

| | | | | | | | | | | |
|---|---|---|---|---|---|---|---|---|---|---|
| Particulate polymer | Hydroxyl group-containing monomer unit | Content [parts by mass] | | 5 | 5 | 5 | 5 | 5 | 5 | 5 | 3 |
| | | Type | | 2-HEA | 2-HEA | 2-HEA | 2-HEA | 2-HEA | 2-HEA | 2-HEA | 2-HEA |
| | | Percentage content in particulate polymer [mass %] | | 1 | 1 | 1 | 1 | 1 | 1 | 1 | 1 |
| | Percentage content of other monomer units in particulate polymer [mass %] | Type | 2-EHA | — | 75 | 75 | 75 | 75 | 75 | 75 | 75 |
| | | | AN | — | 22 | 22 | 22 | 22 | 22 | 22 | 22 |
| | | | ST | 63 | — | — | — | — | — | — | — |
| | | | BD | 32.5 | — | — | — | — | — | — | — |
| | | | IA | 3.5 | 2 | 2 | 2 | 2 | 2 | 2 | 2 |
| | Content [parts by mass] | | | 4 | 4 | 4 | 4 | 4 | 4 | 4 | 4 |
| Polyhydric alcohol polycondensate | Type | | | PG | PG | HEG | PG | PG | PG | PG | PG |
| | Weight-average molecular weight | | | 500 | 750 | 282 | 500 | 500 | 500 | 500 | 500 |
| | Content [parts by mass] | | | 0.7 | 0.7 | 1.0 | 0.1 | 5.0 | 0.7 | 0.7 | 0.7 |
| | Content [times content of fibrous conductive carbon material] | | | 0.7 | 0.7 | 1.0 | 0.1 | 5.0 | 0.7 | — | 0.7 |
| Water-soluble polymer | Type | | | CMC | CMC | CMC | CMC | CMC | PVA | CMC | CMC |
| | Content [parts by mass] | | | 1 | 1 | 1 | 1 | 1 | 1 | 1 | 1 |
| | $\eta 1$ [mPa·s] | | | 800 | 850 | 790 | 800 | 860 | 800 | 800 | 820 |
| | $\eta 0/\eta 1$ [-] | | | 5 | 6 | 5 | 5 | 6 | 4 | 4 | 5 |
| Evalution | Dispersibility of slurry composition for positive electrode | | | A | A | A | B | A | B | B | A |
| | Coatability of slurry composition for positive electrode | | | A | A | A | B | A | B | B | B |
| | Flexibilty of positive electrode | | | A | A | B | B | A | B | A | A |
| | Output characteristics of secondary battery | | | B | A | A | B | B | B | B | B |

TABLE 2

| | | | Comparative Example 1 | Comparative Example 2 | Comparative Example 3 | Comparative Example 4 | Comparative Example 5 |
|---|---|---|---|---|---|---|---|
| Positive electrode active material | Type | | LCO | NMC | LFP | LFP | LFP |
| | Volume-average particle diameter [μm] | | 15 | 5 | 5 | 5 | 5 |
| | Content [parts by mass] | | 100 | 100 | 100 | 100 | 100 |
| Conductive material | Fibrous conductive carbon material | Average fiber diameter [nm] | 10 | 10 | 10 | — | 10 |
| | | Average fiber length [μm] | 10 | 10 | 10 | | 10 |
| | | Content [parts by mass] | 1 | 1 | 1 | | 1 |
| | | Percentage content among conductive material [mass %] | 20 | 20 | 20 | | 20 |
| | Conductive material other than fibrous conductive carbon material | Type | ACB | ACB | ACB | ACB | ACB |
| | | Content [parts by mass] | 4 | 4 | 4 | 5 | 4 |
| Particulate polymer | | Content [parts by mass] | 5 | 5 | 5 | 5 | 5 |
| | Hydroxyl group-containing monomer unit | Type | 2-HEA | 2-HEA | — | — | 2-HEA |
| | | Percentage content in particulate polymer [mass %] | 1 | 1 | | | 1 |
| | Percentage content of other monomer units in particulate polymer [mass %] | Type 2-EHA | 75 | 75 | 76 | 76 | 75 |
| | | AN | 22 | 22 | 22 | 22 | 22 |
| | | ST | — | — | — | — | — |
| | | BD | — | — | — | — | — |
| | | IA | 2 | 2 | 2 | 2 | 2 |
| | Content [parts by mass] | | 4 | 4 | 4 | 4 | 4 |
| Polyhydric alcohol polycondensate | Type | | PG | PG | PG | PG | — |
| | Weight-average molecular weight | | 500 | 500 | 500 | 500 | |
| | Content [parts by mass] | | 0.7 | 0.7 | 0.7 | 0.7 | |
| | Content [times content of fibrous conductive carbon material] | | 0.7 | 0.7 | 0.7 | — | |
| Water-soluble polymer | Type | | CMC | CMC | CMC | CMC | CMC |
| | Content [parts by mass] | | 1 | 1 | 1 | 1 | 1 |
| | $\eta 1$ [mPa·s] | | 760 | 820 | 890 | 800 | 810 |
| | $\eta 0/\eta 1$ [-] | | 4 | 5 | 8 | 4 | 4 |
| Evaluations | Dispersibility of slurry composition for positive electrode | | A | A | D | C | C |
| | Coatability of slurry composition for positive electrode | | A | A | N/A | C | C |
| | Flexibility of positive electrode | | A | A | | D | E |
| | Output characteristics of secondary battery | | C | D | | D | C |

N/A: Positive electrode and secondary battery not produced

It can be seen from Tables 1 and 2 that although dispersibility of the slurry composition for a positive electrode was high in Comparative Examples 1 and 2 in which a positive electrode active material that did not include an iron-containing compound was used, secondary battery output characteristics were noticeably poorer in these comparative examples.

It can also be seen that dispersibility of the slurry composition for a positive electrode was poor in Comparative Examples 3 to 5 in which a particulate polymer including a hydroxyl group-containing monomer unit and a polyhydric alcohol polycondensate were not used together, and secondary battery output characteristics were also poor in Comparative Examples 4 and 5. Note that dispersibility of the slurry composition for a positive electrode in Comparative Example 3 was so poor that it was difficult to produce a positive electrode and a secondary battery.

In contrast, it can be seen that dispersibility of the slurry composition for a positive electrode and secondary battery output characteristics were both excellent in Examples 1 to 17 in which a positive electrode active material including an iron-containing compound, a conductive material, a particulate polymer including a hydroxyl group-containing monomer unit, and a polyhydric alcohol polycondensate were used.

INDUSTRIAL APPLICABILITY

According to the present disclosure, it is possible to provide a slurry composition for a positive electrode that has excellent dispersibility and enables production of a secondary battery that can display good output characteristics.

Moreover, according to the present disclosure, it is possible to provide a positive electrode that enables production of a secondary battery that can display good output characteristics and also to provide a secondary battery that can display good output characteristics.

The invention claimed is:

1. A slurry composition for a non-aqueous secondary battery positive electrode comprising a positive electrode active material, a conductive material, a particulate polymer, and a polyhydric alcohol polycondensate, wherein
the positive electrode active material includes an iron-containing compound,
the particulate polymer includes a hydroxyl group-containing monomer unit,
the polyhydric alcohol polycondensate is polyglycerin and has a weight-average molecular weight of at least 200 and not more than 5,000.

2. The slurry composition for a non-aqueous secondary battery positive electrode according to claim 1, wherein the conductive material includes a fibrous conductive carbon material.

3. The slurry composition for a non-aqueous secondary battery positive electrode according to claim 2, wherein the fibrous conductive carbon material has a percentage content of at least 5 mass % and not more than 100 mass % among the conductive material.

4. The slurry composition for a non-aqueous secondary battery positive electrode according to claim 2, wherein content of the polyhydric alcohol polycondensate is, by mass, at least 0.05 times and not more than 10 times content of the fibrous conductive carbon material.

5. The slurry composition for a non-aqueous secondary battery positive electrode according to claim 1, wherein content of the polyhydric alcohol polycondensate is at least 0.05 parts by mass and not more than 10 parts by mass per 100 parts by mass of the positive electrode active material.

6. The slurry composition for a non-aqueous secondary battery positive electrode according to claim 1, wherein percentage content of the hydroxyl group-containing monomer unit in the particulate polymer is at least 0.05 mass % and not more than 5 mass %.

7. The slurry composition for a non-aqueous secondary battery positive electrode according to claim 1, further comprising at least one water-soluble polymer selected from the group consisting of polyvinyl alcohol, a water-soluble derivative of cellulose, and polyvinyl acetate.

8. The slurry composition for a non-aqueous secondary battery positive electrode according to claim 1, wherein a ratio $\eta 0/\eta 1$ of viscosity $\eta 0$ of the slurry composition at a shear rate of 10 $s^{-1}$ relative to viscosity $\eta 1$ of the slurry composition at a shear rate of 1,000 $s^{-1}$ is at least 2 and not more than 10.

9. A positive electrode for a non-aqueous secondary battery obtained using the slurry composition for a non-aqueous secondary battery positive electrode according to claim 1.

10. A non-aqueous secondary battery comprising a positive electrode, a negative electrode, a separator, and an electrolyte solution, wherein the positive electrode is the positive electrode for a non-aqueous secondary battery according to claim 9.

11. The slurry composition for a non-aqueous secondary battery positive electrode according to claim 2, wherein an average fiber length of the fibrous conductive carbon material is 1 μm or more and 200 μm or less.

* * * * *